Jan. 25, 1966 A. W. VINAL 3,231,871

MAGNETIC MEMORY SYSTEM

Filed Dec. 30, 1960 4 Sheets-Sheet 1

INVENTOR
ALBERT W. VINAL

BY Ralph R Barnard
ATTORNEY

Jan. 25, 1966 A. W. VINAL 3,231,871

MAGNETIC MEMORY SYSTEM

Filed Dec. 30, 1960 4 Sheets-Sheet 4

3,231,871
MAGNETIC MEMORY SYSTEM

Albert W. Vinal, Owego, N.Y., assignor to International Business Machines Corporation, New York, N.Y., a corporation of New York Filed Dec. 30, 1960, Ser. No. 79,722
9 Claims. (Cl. 340—174)

This invention relates generally to digital storage systems and more particularly to means for converting digital information stored in a random access nondestructive memory to serial binary digital information during a read-out operation. The invention claimed herein relates to the memory system. The novel sampling switch disclosed herein is the subject matter of co-pending application Serial Number 205,769, "Electrical Switching Means," filed June 27, 1962, which is a division of this case and is assigned to the same assignee as the present invention.

There are many engineering compromises which have to be made in selecting the type of storage unit for an electronic digital system requiring a memory function. One consideration is the access time required to transfer information from the storage for use in the system. When a storage system is used wherein it is possible to have access to any given unit of binary digital information represented by one or more digits at any particular time, the memory system is classified as being of the "random access type." One example of the memory which is of the random access type is the toroidal core memory where each core is arranged along X, Y, and Z coordinates so that coincident energization of two or more conductors enables a determination of the nature of the binary information stored in that element. While such a memory system has substantial advantage that its contents at any particular or several locations may be readily attainable at any instant, the toroidal magnetic core memory has a shortcoming that the information stored at the particular location is destroyed during the reading operation. Therefore, it is classified as a destructive type memory.

By way of contrast, the storage of binary digital information on magnetic tracks of a revolving drum is of the nondestructive type because the passage of the record track under the reading head does not destroy the information recorded thereon unless additional erasing means is specifically utilized. While the magnetic drum as a storage device has the desirable feature of being nondestructive, it does not have the desirable characteristic of being of the random access type because information cannot be read from the record track until that track has moved under a reading head. While the toroidal core matrix and the magnetic drum are not the only known digital memory devices, they are representative of two classes of memories with respect to these two desirable features of operation.

Another desirable feature for a digital memory would be that the binary digital information stored thereon is available in either serial form or in parallel form, or a combination of the two in accordance with the particular computer system in which the digital memory is operating. Whether a computer system is designed to handle the binary coded digital information in parallel or serial form or a combination thereof is in itself a matter of engineering compromise determined by the particular computer environment. For example, serial operation usually requires less equipment and a longer time to perform a particular operating function and parallel operation requires a greater amount of equipment and less time to perform a particular function of operation. Basically, the toroidal core matrix memory is of the parallel read-out type because random access to a particular digital information with a minimum of address drive requires addressing a whole word at a time. Also, the addressing for purposes of interrogation of each bit of a word stored in a toroidal core memory matrix results in the destruction of the stored magnetic condition. Therefore, the information which must be read out in parallel, is stored in a temporary register for writing the same information back in the memory.

Conversely, the magnetic drum which is not random access in operation is of the type that the information must be read out in either serial or serial parallel but never completely in parallel. The reason that the magnetic drum cannot be used to simultaneously read out separate bits of a binary digital unit of information from separate tracks is based on the inability to accurately align plural heads each on a separate track. Thus, neither the magnetic drum nor the magnetic toroidal core coordinate matrix type memory satisfy the highly desirable operational capability of being susceptible to either parallel or serial or serial parallel read-out of digits of binary coded digital information in a random access nondestructive memory environment.

While it has been known in the prior art for a substantial period that the toroidal core as a memory element had a nondestructive type counter part known as a transfluxor type device, that device has not been recognized as being usable in a matrix array for the purpose of providing a three-dimensional random access nondestructive memory susceptible to parallel, serial parallel, or serial read-out as the particular application required. Based on the teachings of the prior art, it was not known that a magnetic memory was economically susceptible to anything except a parallel type read-out technique.

It is, therefore, a primary object of the present invention to provide a new and improved means for economically converting digital information stored in random access nondestructive memory to serial binary digital information during a read-out operation.

It is still another object of the present invention to provide a new and improved means for economically converting digital information stored in a random access nondestructive memory to serial binary digital information during a read-out operation where each bit of plural bits making up a unit of digital information is stored in separate core planes.

It is another object of the present invention to provide a new and improved means for econcmioally converting digital information stored in a random access nondestructive memory to serial parallel binary digital information.

It is a further object of the present invention to provide a new and improved means for converting digital information stored in a three-dimensional matrix random access nondestructive memory to either parallel, serial, or serial parallel binary digital information during a read-out operation.

It is an additional object of the present invention to provide a new and improved means for economically converting digital information stored in a three-dimensional random access nondestructive memory matrix utilizing a minimum of electrical circuitry during a read-out operation.

The objects of the present invention are provided by constructing a memory system of many nondestructive memory elements arranged so that plural memory elements, each storing a binary bit making up a unit of binary digital information, may be repetitively addressed according to a matrix selection scheme in combination with electrical switching means having plural inputs each connected to a sensing means associated with each of the plural memory elements for the purpose of serializing the binary bits making up a unit of binary digital information which is stored in the plural memory elements.

The foregoing and other objects, features and advantages of the invention will be apparent from the following more particular description of preferred embodiments of the invention, as illustrated in the accompanying drawings.

In the drawings:

FIGS. 1*a* and 1*b* show an exemplary individual nondestructive memory element in the blocked and unblocked condition, respectively which enables one to practice the teachings of the present invention. The element in itself forms no part of the teachings of the present invention;

Figures 1A, 1B:
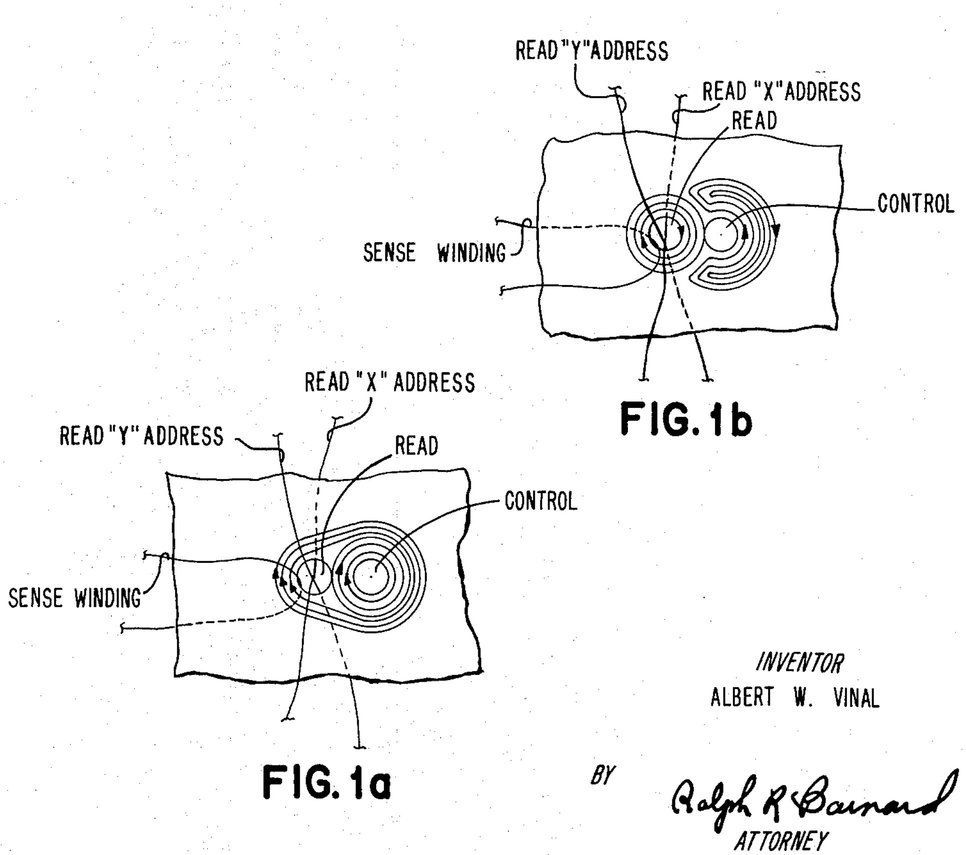

Referring again to FIGS. 1*a* and 1*b*, there is shown a nondestructive memory element which is utilized in a memory system of a preferred embodiment according to the teachings of the present invention. The memory element comprising two apertures and the magnetic material surrounding them is an improved transfluxor type device and the subject matter of a co-pending application, Serial Number 823,525, Magnetic Devices, filed June 29, 1959, and now abandoned and assigned to the same assignee as the present invention. That co-pending application describes the operation of the memory element in great detail. However, inasmuch as the present invention is concerned with reading binary digital information from a memory made up of these elements, it is desirable that the reading operation of this device be described herein. FIG. 1*a* shows the two-apertured memory element in its blocked condition representing a binary 0. The aperture on the left functions as the read aperture, and the aperture on the right functions as the control aperture. By means not shown, the control aperture is used to place the magnetic material around the read aperture in a blocked condition by deriving a magnetomotive force which orients the flux on both sides of the read aperture in the same direction as shown.

Consequently, when coincident current pulses of normal operating amplitudes are applied to both the read X address and read Y address conductors, sufficient magnetomotive force will not be generated in the magnetic material adjacent the read aperture to reverse the flux around that aperture because the path length over which the magnetimotive force must be effective includes the path extending around the control aperture. Since no flux (or very little) is reversed around the read aperture, no voltage is induced in the sense winding and the two-apertured magnetic element has been demonstrated to be in the blocked or binary 0 condition.

FIG. 1*b* shows the same aperture pair in the unblocked or binary 1 condition. Since changing the binary condition of the aperture pair forms no part of the present invention, no means are shown to apply the control magnetomotive force to the magnetic material around the control aperture for switching from the blocked to the unblocked condition. However, it should be noted that the magnetic flux adjacent the read aperture are now in reverse directions and the effective path length with respect to the read aperture is now along the inner wall thereof. Therefore, the coincident current pulses of normal operating amplitudes being applied to the read X address and the read Y address conductors will be sufficient to reverse the flux around the read aperture and induce a voltage in the sense winding thereby demonstrating that an unblocked condition or binary 1 is stored in the two-apertured memory element.

Figure 2:
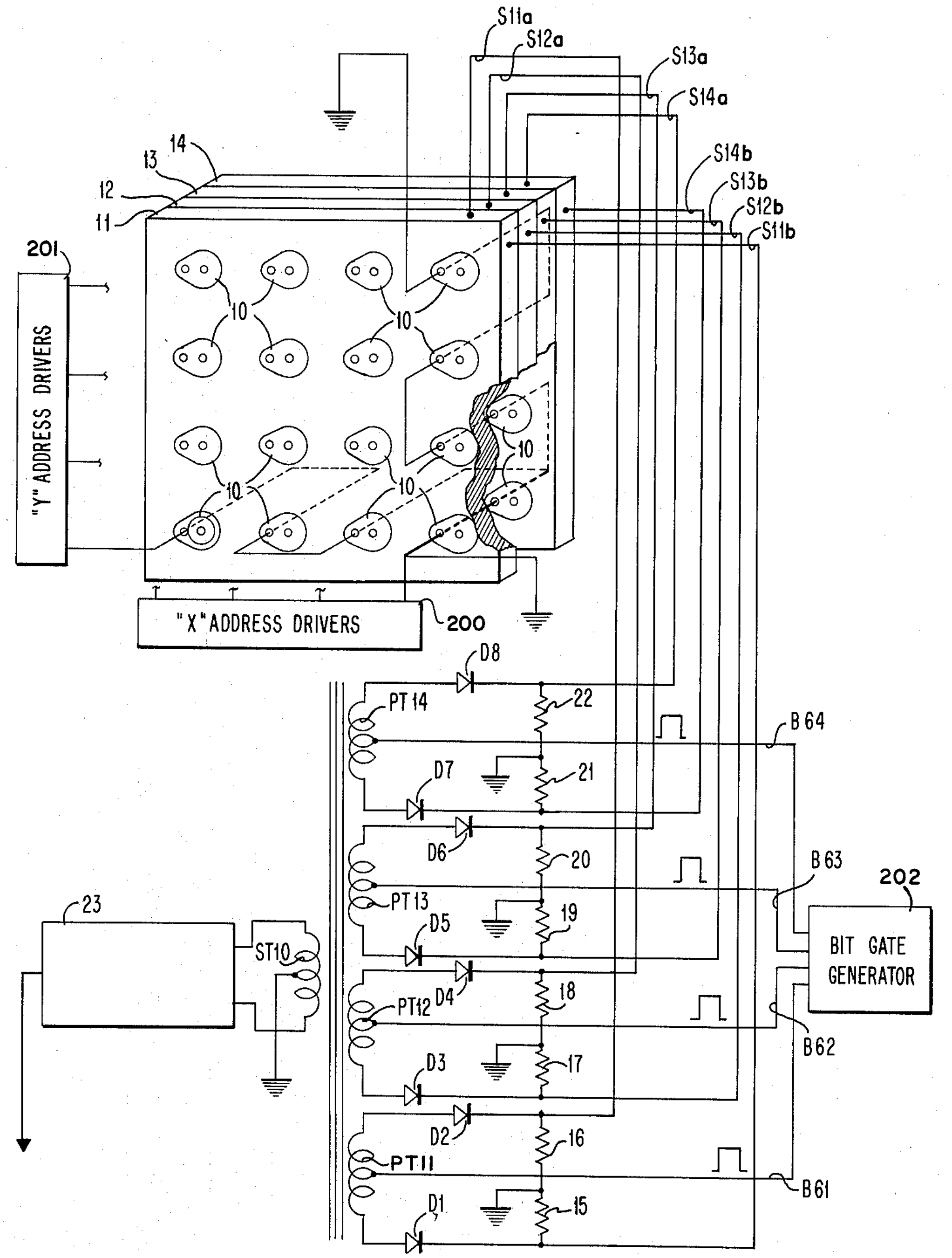
FIG. 2 shows a memory system utilizing the memory element of FIG. 1 arranged in a three-dimensional matrix array with economical serial read-out features according to the teachings of the present invention.

When it is desired to make a random access memory comprising elements operating in accordance with FIGS. 1*a* and 1*b*, the elements may be arranged in plural planes for X and Y coordinate addressing. FIG. 2 shows such an array. Therein plural apertured memory elements 10, such as described in FIGS. 1*a* and 1*b*, are arranged in plural planes 11, 12, 13, and 14. By way of example, if the two-apertured memory elements 10 of plane 11 each represent the first bit of 16 binary words, then the corresponding two-apertured memory elements in the adjacent planes represent the second, third, and fourth bits in each of the 16 binary words. This three-dimensional array of magnetic elements is merely exemplary of practical embodiments. It is, of course, expected that the number of bits in any binary word may be substantial, for example 24, 32, etc. In those instances, a like number of memory planes would be utilized. Moreover, while 16 two-apertured memory elements 10 are shown in a given plane, the number which will be utilized in a practical embodiment will vary greatly in accordance with the word capacity of the memory.

One of the essentials of a memory system is that the amount of addressing equipment be limited. One of the ways of economizing is to utilize the X and Y coordinate addressing conductors to select the read aperture storing the first bit of a binary word within the first plane and at the same time pass the same conductors through the read aperture of all the elements with a corresponding X and Y coordinate position in all the other planes representing the bits or the other orders of significance defining a digital word. Thus, all of the bits of a unit of binary digital information, such as a word, are addressed simultaneously by the same X and Y read address conductors. This fact led to the requirement of parallel read out from a toroidal core matrix because the memory element was of the destructive read-out type.

In order not to unnecessarily complicate the description of the present invention, only one X and Y coordinate read address conductor is shown. For example, the single Y address read conductor shown passes through the read aperture of the apertured memory element 10 in the lower left hand corner of plane 11; thence through the read aperture of all the corresponding memory elements 10 in planes 12, 13, and 14 from front to back; thence through all the memory elements 10 of the adjacent row having the same Y coordinate from back to front etc. Following this technique, the Y read address conductor passes through the read aperture of the memory elements 10 of each plane in the lower right hand corner from back to front and is grounded as shown.

Similarly, the single X address read conductor shown, passes through the read aperture of the apertured memory element 10 in the lower right hand corner of plane 11; thence through the read aperture of all the corresponding memory elements 10 in planes 12, 13 and 14 from front to back; thence through all the memory elements 10 of the adjacent row having the same X coordinate from back to front etc. Following this technique, the X read address conductor passes through the read aperture of the memory elements 10 of each plane in the upper right hand corner from back to front and is grounded as shown.

While only a single read address conductor is shown being appropriately energized by conventional X address drivers 200, it should be noted that there will be an X read conductor for each row of two-apertured memory elements along the X coordinate. Similarly, only a single Y read address conductor is shown being appropriately energized by Y address drivers 201 even though a Y address conductor will be required for every column of two-apertured memory elements along the Y axis. For the purpose of the present invention, it is essential that X address drivers and the Y address drivers be able to provide repetitive bipolar pulses to selected X and Y read address conductors. Such driver means are well known. By way of example, the driver system disclosed in co-pending application Serial Number 770,667, entitled "Binary Memory System," filed October 30, 1958, now U.S. Patent No. 2,988,732 and assigned to the same assignee as the present application, describes an address system which may be used for both the X address drivers 200 and the Y address drivers 201. Other means are known by those skilled in the art.

Figure 3:
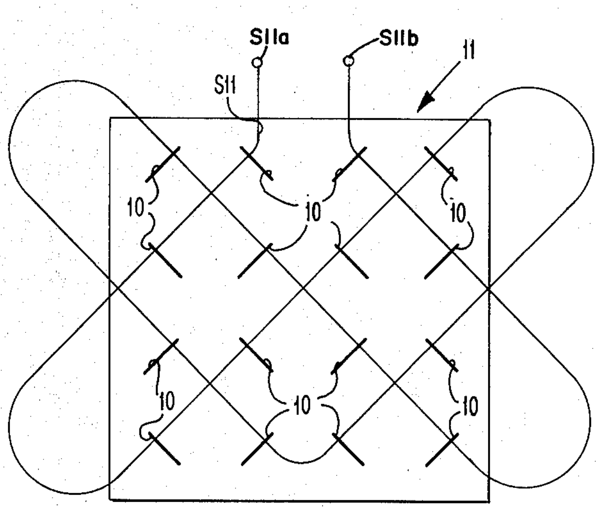
FIG. 3 shows the arrangement of the sense winding passing through all of the nondestructive memory elements in a single plane.

The two-apertured device of FIGS. 1*a* and 1*b*, when arranged in core planes as shown in FIG. 2, must include a single sense winding threading each of the read apertures of each of the two-apertured memory elements within the memory plane. FIG. 3 shows an arrangement of two-apertured memory elements 10 within a plane according to X and Y coordinates. Therein a single sense winding S11 is passed through the read aperture of each two-apertured element in a particular plane exemplified by plane 11 of FIG. 2. It will be noted that the sense winding S11 passes through half of the two-apertured memory elements in one direction and half of the two-apertured memory elements in the other direction. Such an arrangement of a sense winding with itself is conventional and has for a purpose the canceling the half address noise induced in the sense winding when it passes through memory elements which are not fully addressed for read out. As shown sense winding S11 has two output terminals **S11*a* and S11*b***.

Referring back to FIG. 2, S11 output terminals **S11*a* and S11*b* are shown as providing the output signal from memory plane 11. Similarly, output terminals S12*a* and S12*b* are associated with the sense winding passing through the memory elements of memory plane 12; outputs S13*a* and S13*b* are associated with the sense winding passing through the memory elements of memory plane 13; output terminals S14*a* and S14*b* are associated with the sense winding passing through the memory elements of memory plane 14. Assuming that the X and Y read address conductors shown are coincidentally addressed, each of the two-apertured memory elements 10 in the lower right hand corner of planes 11, 12, 13, and 14 will be interrogated to determine the binary condition being stored in each. Had each of these two-apertured memory elements been of the destructive read-out type, it would have been necessary to sample the outputs from the sense windings S11, S12, S13 and S14 to determine the binary coded digital information stored in each so that it may be utilized in the computer system and/or written back into that location of the memory. Because sense windings S11, S12, S13, and S14** had to be sampled simultaneously, the magnetic core memories operating on a three-dimensional X and Y coordinate addressing scheme were considered to be inherently of the parallel read-out type. This meant that a separate sense amplifier had to be operatively associated with each sense winding and memory plane for simultaneous detection of this parallel information. Moreover, parallel read-out meant that a separate temporary storage register had to be maintained in the output and responsive to the plural sense amplifiers to store the binary information being read out. Of course, when it was desired to write the information back in the memory at the same or other locations, this temporary storage register (having the number of storage positions commensurate with the number of memory planes and binary bits being read out in parallel) was used as a source for the input information.

It was recognized by the applicant, that since the two-apertured memory elements 10 being coincidentally addressed through the read aperture could be of the non-destructive type, it was no longer necessary and mandatory to read out the information from sense windings S11, S12, S13, and S14 in parallel, because the information stated being interrogated continued to be available. Therefore, if it were desired to serialize the binary information stored in the two-apertured memory elements in the lower right hand corner of core planes 11, 12, 13 and 14, it was only necessary to repetitively address that same X and Y location and successively sample, at the same frequency, sense windings S11, S12, S13, and S14.

It is an extremely important feature of the teachings of this invention that since each of the two-apertured memory elements in the lower right hand corner of planes 11, 12, 13 and 14 may be repetitively coincidentally read addressed (with a signal or zero signal being simultaneously derived within each sense winding S11, S12, S13, and S14 as a result of each reptitive addressing operation in accordance with the stored binary information) that this digital information may be serialized by successively connecting each of the sense windings to a single output channel. This successive connection may be in turn be provided by the transformer shown having plural primary windings PT11, PT12, PT13, and PT14 and a single output windings ST10 on a single core.

As shown, each of the primary and secondary transformer windings are center tapped. The center taps of the primary windings are connected to a bit gate generator 202 as shown, while the center tap of the secondary winding is grounded. The extremities of the secondary winding ST10 are utilized to provide an input to differential amplifier 23. Differential amplifier 23 accordingly acts as a single output channel for the binary digital information being read from the coincidentally read addressed two-apertured memory elements. Since the sense winding from one coincidentally addressed memory element 10 is being sampled at a time, the digital information in the single channel is a serialized version of the stored information.

Connected between each extremity of primary winding PT11 and sense winding terminals **S11*a* and S11*b* are diodes D1 and D2 oriented in the direction shown; connected between each extremity of primary winding PT12 and sense winding terminals S12*a* and S12*b* are diodes D3 and D4 oriented in the same direction shown; connected between each extremity of primary winding PT13 and sense winding terminals S13*a* and S13*b* are diodes D5 and D6 and oriented in the direction shown, and connected between each extremity of primary winding PT14 and sense winding terminals S14*a* and S14*b* are diodes D7 and D8** oriented in the direction shown.

Also connected across one terminal of diode D1 and one terminal of diode D2, remote from the primary winding PT11 are two balancing resistors 15 and 16. The common terminal of these resistors is grounded. Connected across one terminal of diode D3 and one terminal of diode D4, remote from the primary winding PT12, are two balancing resistors 17 and 18 connected in series. The common terminal of these resistors is grounded. Connected across one terminal of diode D5 and one terminal of diode D6, remote from the primary winding PT13, are two balancing resistors 19 and 20 connected in series. The common terminal of these resistors is grounded. Connected across one terminal of diode D7 and diode D8, remote from the primary winding PT14, are two balancing resistors 21 and 22 connected in series. The common terminal of these resistors is grounded.

Thus, each of the primary windings, associated diodes and resistors form a balanced bridge which function in response to a bit gate generator to operatively connect the extremities of the primary windings to the output terminals of the sense winding associated with a memory plane. Specifically, a voltage pulse generated by a conventional gate generator 202 which will be referred to as BG1 is applied to the center tap of primary winding PT11 for the purpose of forward biasing diodes D1 and D2 and connecting the extremities of that primary winding to output terminals **S11*a* and S11*b*** of the sense winding S11 associated with memory plane 11 as described hereinabove.

Similarly, a voltage pulse generated by bit gate generator 202 referred to as BG2 is applied to the center tap of primary winding PT12 to forward bias diodes D3 and D4 so as to operatively connect the extremities of that winding to terminals S12*a* and S12*b* of sense winding 12 associated with memory plane 12; a voltage pulse generated by gate generator 202 referred to as BG3 applied to the center tap of primary winding PT13 will forward bias diodes D5 and D6 so as to operatively connect the extremities of that winding to terminals S13*a* and S13*b* of sense winding 13 associated with memory plane 13; and a voltage pulse generated by gate generator 202 referred to as BG4 applied to the center tap of primary winding PT14 will forward bias diodes D7 and D8 so as to operatively connect the extremities of that winding to terminals S14*a* and S14*b* of sense winding 14 associated with memory plane 14.

Bit gate generator 202 may be of conventional construction typified by that which would be present in any serial computor or data processing system. However, it should be clear that the repetition rate at which these bit gate voltage pulses BG1, BG2, BG3 and BG4 are generated must coincide with the repetition rate at which the coincidentally addressed two-apertured memory elements 10 are being repetitively addressed. Assuming again that the memory elements 10 in the lower right-hand corner of planes 10, 11, 12, 13 and 14 are being repetitively coincidentally addressed, successive voltage bit gates BG1, BG2, BG3 and BG4 applied successively to the center taps of primary windings PT11, PT12, PT13 and PT14 will derive in secondary winding ST10 serial voltages which are commensurate with the serial binary information four binary bits in length respective of the unit or word of digital information stored at that location in the memory.

Figure 4:
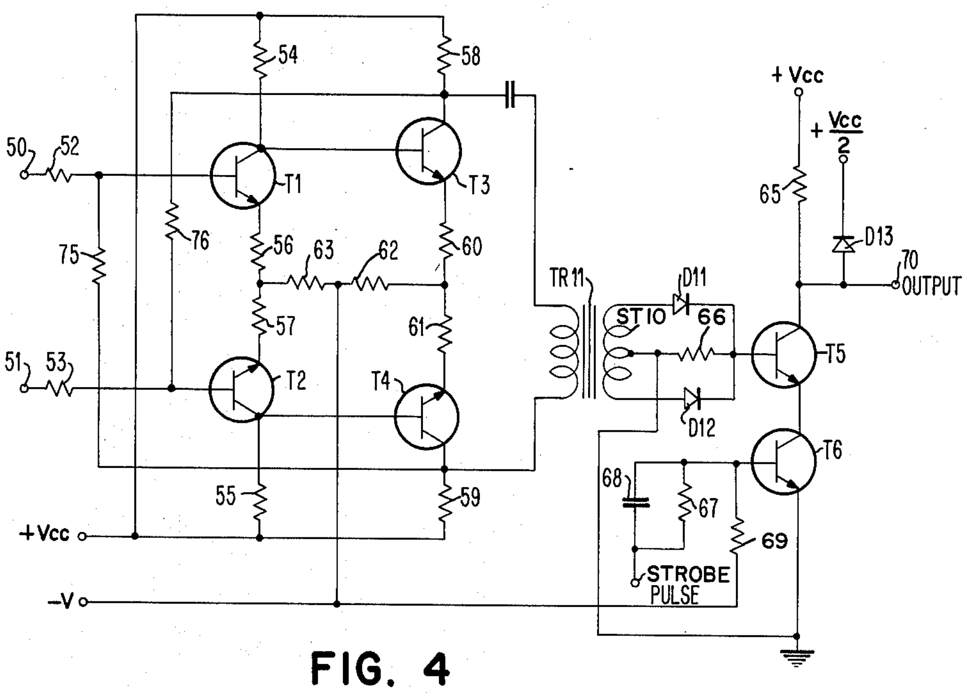
FIG. 4 shows a detailed circuit diagram of an exemplary sense amplifier which can be utilized in the system shown in FIG. 2.

Since the voltage signals induced in the secondary winding have half address voltage noise included therein it is desirable that the secondary ST10 be center tapped and the output from the extremities applied to a differential amplifier 23 for reducing the common mode noise. Differential amplifier 23 may be of one of several conventional constructions. However, FIG. 4 illustrates one particular differential amplifier which may be used. Referring to FIG. 4 there is shown two input terminals 50 and 51 each providing an input to transistors T1 and T2 through resistors 52 and 53, respectively. Transistors T1 and T2 cooperate as a single differential amplifier stage with resistors 54 and 55 functioning as collector biasing resistors. As shown these resistors connect the collectors of T1 and T2 to voltage source $V_{cc}$. As is usual in differential amplifiers, resistors 56 and 57 are connected to the emitters of T1 and T2, respectively and commoned. These resistors provide the usual current feedback function to provide operating point stability. T3 and T4 are connected to cooperate as a second stage of differential amplification and are direct coupled to the first stage. Resistors 58 and 59 serve to connect the collectors of T3 and T4, respectively to voltage source $+V_{cc}$. The emitter of T3 is connected to the emitter of T4 via commoned resistors 60 and 61. These resistors provide the well-known current feedback function. Finally the common terminals of resistors 60 and 61 and resistors 56 and 57 are connected to a negative potential or to ground through resistors 62 and 63, respectively. Resistors 62 and 63 provide a biasing function. The collectors of T3 and T4 of the second stage of the differential amplifier are then each connected to the extremities of the primary winding of transformer TR11.

As shown the collector of T4 is fed back to the base of T1 through resistor 75 and the collector of T3 is fed back to the base of T2 via resistor 76. This external voltage feed back in addition to the local current feed back provided by resistors 56, 57, 60 and 61 acts to stabilize the gain of differential amplifier for wide variations of transistor characteristics and temperature variations.

While the secondary of transformer TR11 when operating in the system of FIG. 2 will contain serial binary information commensurate with the unit or word of information being read from the memory, it is desirable that additional means be utilized to reduce the amount of voltage noise contained thereon. This is accomplished by applying the voltage output of the secondary transformer TR11 to one input of a two-input active element And circuit. The collector of T5 is connected to a voltage supply via resistor 65 and the collector of T6 is connected to the emitter of T5. The emitter of T6 is grounded. Diode D13 connected to the collector of T5 serves a clamp function. The output of the secondary of transformer TR11 is applied to the base of transistor T5 to provide one input of the And circuit. Specifically, one extremity of the secondary winding is connected to the base through D11 while the other extremity of the secondary winding is connected to the base through D12. The center tap of the secondary winding is grounded and the base of transistor T5 is grounded through biasing resistor 66. The base of transistor T6 is connected to a voltage $-V$ or to ground through resistor 69. The other input to the active And circuit is in the form of a strobe pulse being applied to the base of transistor T6 via a parallel circuit comprising resistor 67 and capacitor 68. The strobe pulse source may be conventional. However, it is important that it be wide enough to strobe each binary bit of the serial binary digital information train being supplied to the base of transistor T5. Of course, it is necessary that its repetition rate be the same as the rate which this information is being generated in the secondary ST10 of the switching transformer and the input to the base of transistor T6. Accordingly a relatively clean voltage pulse will be generated in the output terminal 70 at a voltage level which is usable in a computer system. Thus, the And circuit operates to both improve the voltage level and decrease the amount of voltage noise in the serial binary digital information being generated.

Figure 6A:
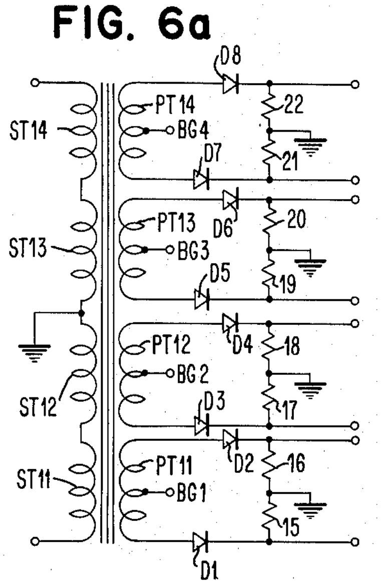
FIGS. 6*a* and 6*b* illustrate alternate embodiments of the transformer switch shown in FIG. 2.
Figure 6B:
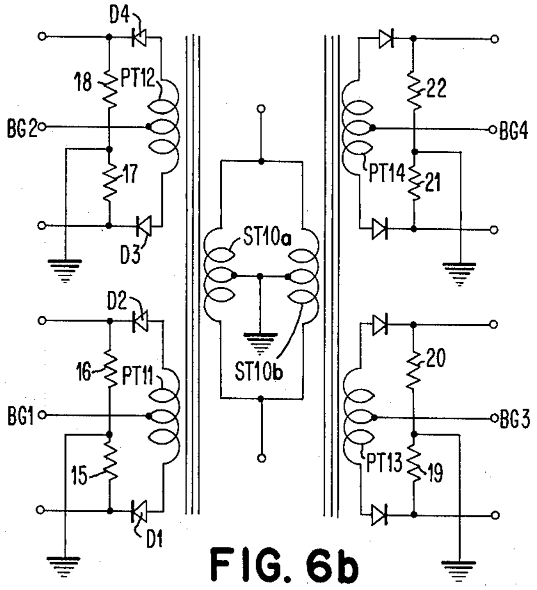

While FIG. 2 shows one physical arrangement of the transformer switch of the present invention and used according to the present invention, modifications may be made as to the details of the transformer sampling switch without departing from the teachings of the present invention. FIGS. 6*a* and 6*b* illustrate some of the modifications that may be made. Referring to FIG. 6*a*, the same identification numerals are utilized for identical components to those which appear in the transformer sampling switch of FIG. 2 so that the modification is more readily understandable. In FIG. 6*a* for example, instead of there being just one secondary winding as in FIG. 2 there are four secondary windings ST11, ST12, ST13 and ST14. As shown, each of these windings are connected in series to provide two output terminals at the extremities of the series circuit. The common terminal of ST12 and ST13 is grounded. The primaries are selected in exactly the same manner as described in FIG. 4 by the successive application of bit gate voltage pulses to the center tap of PT11, PT12, PT13 and PT14. As before on receipt of the appropriate bit gate voltage pulse, PT11 will be operatively connected to sense winding S11 in plane 11, PT12 will be operatively connected to sense winding in plane 12, PT13 will be operatively connected to sense winding in plane 13 and PT14 will be operatively connected to sense winding in plane 14.

Referring now to FIG. 6*b*, there are two transformer cores with two of the primary windings on each. PT11 and PT12 are wound on one core, while PT13 and PT14 are wound on the other core. For each transformer core there is one secondary winding. Secondary winding ST10*a* operates with the first core and secondary winding ST10*b* operates with the second core. As shown each of the transformers is center tapped and grounded. Each of the corresponding extremities of the two secondary windings are commoned to provide two output terminals for generating an output signal for application to differential amplifier. The selection and energization of each primary winding is identical with the operation of FIG. 6*a* and FIG. 2.

While there are a number of arrangements of the electrical transformer sampling switch according to the teachings of the present invention (three of which are) illustrated in FIGS. 2, 6*a* and 6*b*, it is emphasized that the fundamental teachings with respect thereto are included in each of the figures. Specifically, the function of the electrical sampling switch is to sample a signal source having the combination of a relatively low desired signal, a differential noise signal and a common mode noise signal. Since the desired signal and the differential noise signal are often in a degree adjacent in time it is usual to avoid some of this differential noise signal by gating the output of the signal source to be available only during the times that the signal is present. Other means such as differential amplifiers are utilized to reject the common mode noise. One of the problems associated with gating the output at the signal source is that electrical high speed gating device of the prior art cause a differential voltage level change in the signal channel such that the desired signal is not readily recognizable in the presence of the gate. The sampling switch of the present invention provides an electrical sampling switch for gating the output of a desired signal source without introducing the undesired differential voltage level change and at the same time provides a measure of common mode noise rejection. Referring specifically to FIG. 2, each of the center tapped primary windings (exemplified by PT11) have a unidirectional device (exemplified by D1 and D2) connected between each of its extremities and the two terminals of a signal source (exemplified by S11*a* and S11*b*). Connected across one terminal of each of the unidirectional devices which is remote from the extremities of the primary winding are two resistors 15 and 16 connected in series. The common connection between these two resistors is grounded. A gating voltage pulse is applied to the center tap of the primary winding whenever it is desired to forward bias the normally reverse biased unidirectional devices so that the desired signal is applied to the primary winding from the signal source.

Specifically, the resistance of resistors 15 and 16 are selected so that when a voltage gating pulse is applied to the center tap of the primary winding PT11 and diodes D1 and D2 are forward biased that the voltage levels of source terminals S11*a* and S11*b* referred to ground are equal. Under such conditions, the voltage gate applied to the center tap of a primary winding does not introduce an undesired differential voltage level change in the signal being generated at terminals S11*a* and S11*b*. Moreover, if the voltage gate being applied to the center tapped primary winding is of appropriate width and is appropriately timed, some of the differential noise present in the signal source (sense winding 11) will be rejected by the normally back biased diodes.

Since no undesired differential voltage level change is introduced in the connection of the signal source to the primary winding, there is no requirement of waiting until the adverse voltage level change has been dissipated to read the desired signal. This allows the technique to be used for extremely high speed sampling. In addition, the desired signal need not be of large amplitude in comparison with the undesired differential voltage level change since there is none. One other feature with respect to the operation of the teachings of the present invention is that a common mode noise rejection is obtained since the two-terminal signal source is connected to the extremities of the primary winding and the secondary winding (exemplified by ST10) cooperating with the primary winding does not receive a signal commensurate therewith. Another desirable feature is to select the series sum of the resistance values of resistors 15 and 16 so that it is equal to the characteristic impedance of the signal source representing the sense winding. Since the signal source of this specific example (the sense winding 11) is ungrounded the center tap to ground between resistors 15 and 16 does not adversely affect this impedance matching. The detailed description of the operation of PT11 with respect to the signal source and the voltage gates from bit gate generator 202 is applicable to the other primary windings and related circuitry. By use of the teachings of the present invention, plural signal sources may be sampled successively without the introduction of adverse differential voltage levels which would destroy or depreciate the signal being sensed. As those skilled in the art will recognize, the electrical sampling switch according to the present invention has wide applicability to serializing and successively sampling plural signal sources.

While there is shown in FIG. 2 within each core plane only 16 two-apertured memory elements 10, it should be clear that any number could be included commensurate with a particular design criteria. Normally however, it is desirable that there be an equal number of two-apertured memory elements 10 along each coordinate. This optimizes the total read and control address circuitry for a given memory capacity. While four memory planes are shown in FIG. 2 representing four digits making up a unit or word of digital information, it should be clear most units of digital information will be more than four digits or bits in length and a sufficient number of planes will be used compatible with the design of the memory. It should be clear also that two units or words could be stored in a given X–Y memory location where for example the first group of planes relate to the storage of the first word at a given location and the latter planes relate to the storage of the second digital word in a given location. Moreover, more than two words may be stored at given X–Y positions by increasing the number of planes even more.

Figure 5:
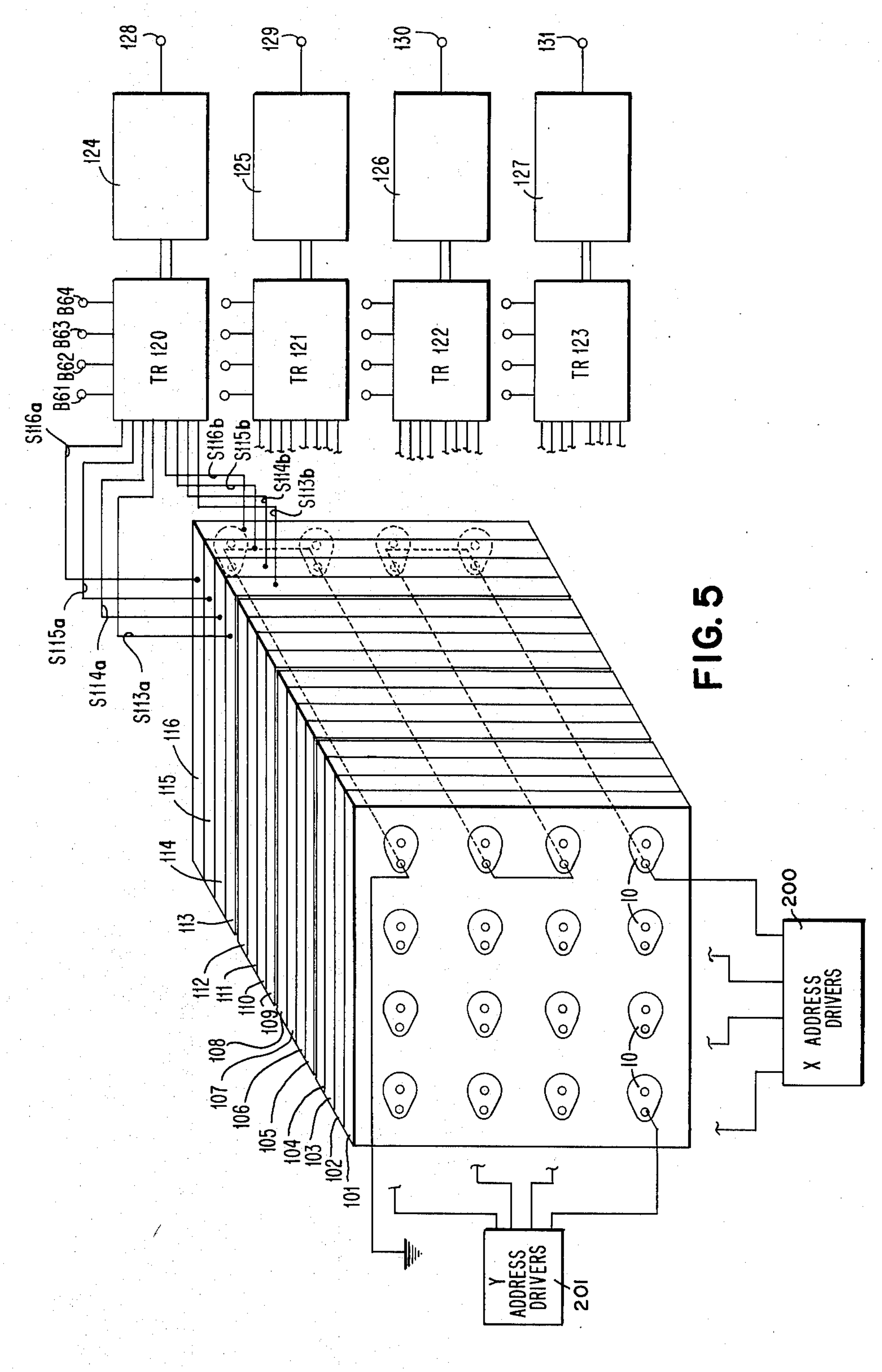
FIG. 5 shows a block diagram of a memory system utilizing the memory element of FIG. 1 arranged in a three-dimensional matrix array with serial-parallel read-out features according to the teachings of the present invention.

While the teachings of the present invention have been described in detail with respect to serializing the stored digital information during readout, it should be clear that the techniques described have applicability in reading out information in serial parallel form in addition. For example, referring to FIG. 5, there is shown a three-dimensional memory comprising for illustration purposes in sixteen planes of two-apertured memory elements. As in FIG. 2 there are four memory elements along each of the X and Y coordinates. X read address driver 200 is shown cooperating with X address conductors in the same manner as shown in FIG. 2 and Y read address driver 201 is shown cooperating with Y address conductors. The 16 two-apertured memory element planes 101–116 are shown divided into four groups and associated with each group of memory planes are electrical transformer transfer sampling switches TR120, TR121, TR122 and TR123 constructed in accordance with that shown in FIG. 2 (or FIG. 6*a* or FIG. 6*b*). Each of these transformer sampling switches has two input terminals connected to the terminals of sense winding associated with memory plane. For example, terminals S113*a* and S113*b* are connected to transformer switch TR120; S114*a* and S114*b* are connected to transformer sampling switch TR120; S115*a* and S115*b* are connected to transformer sampling switch TR120; and S116*a* and S116*b* are connected to transformer sampling switch TR120. Transformer sampling switches TR121, TR122 and TR123 are similarly connected to the sense windings of the corresponding planes. As in FIG. 2, each of the transformer sampling switches are connected to cooperate with a differential amplifier exemplified by that shown in detail in FIG. 4. Differential amplifier 124 is shown connected to TR120; differential amplifier 125 is shown connected to TR121; and differential amplifier 126 is shown connected to TR122 and differential amplifier 127 is shown connected to TR123. Each transformer sampling switch receives bit gate voltage pulse inputs BG1, BG2, BG3 and BG4 in the same manner as described hereinabove with respect to FIG. 2.

Thus, if for a given X–Y location in all of the bits of a binary word (24 for example) in the corresponding two-apertured memory elements for the 24 planes shown, it is possible to read out that binary word in serial parallel fashion. More specifically, if appropriate read X and read Y address drivers 200 and 201 are repetitively addressed and transformer switches TR120, TR121, TR122 and TR123 are appropriately gated as described hereinabove, the stored digital word will be generated at output terminals 128, 129, 130 and 131 in serial parallel fashion. For example, bits $2^0$, $2^1$, $2^2$, and $2^3$ will appear in that order at output terminals 131; bits $2^4$, $2^5$, $2^6$, and $2^7$ will appear in that order at output terminal 130; bits $2^8$, $2^9$, $2^{10}$, and $2^{11}$ will appear in that order at output terminal 129 and bits $2^{12}$, $2^{13}$, $2^{14}$, and $2^{15}$ will appear in that order at output terminal 128.

While the teachings of the present invention have been described with respect to particular embodiments, it should be clear that they have wide application outside of the specific examples described. For example, while the digital information being read out from storage has been described with respect to particular bit lengths and functional type of digital information, it should be clear that the size of the units (words, etc.) is a matter which would vary from practical application. Moreover, data words, instruction words, and any other information susceptible to the general type of data systems may be sampled for read-out in accordance with the teachings of the present invention. While the signal source to be serialized has been shown in separate memory planes, it should be clear that they might be in the same memory plane which is sectionalized by plural sense windings. Furthermore, the particular type of non-destructive memory element utilized to describe the teachings of the present invention need not be of the particular two-apertured type but may be of different construction since it only requires that the signal with the source not be destroyed by prior attempts to interrogate its condition.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electrical digital system comprising an information storage consisting of non-destructive information elements having distinctive stable states, sensing means associated with said non-destructive information elements for providing an electrical indication of its stable state, repetitive means for energizing said non-destructive information elements to derive an indication of its stable state in its associated sensing means, electrical sampling switch means having plural inputs and a single output, wherein each of said plural inputs is responsive to a different one of said sensing means, gating means for selectively connecting one of said inputs of said electrical sampling switch means with said single output, repetitive means for operating said gating means for serially sampling each sensing means in synchronism with said repetitive sampling means so as to derive serial binary information representing a unit of stored binary informtion in said plural non-destructive information elements.

2. A memory read-out system comprising a random access non-destructive memory means for repetitively addressing selected plural locations in said random access non-destructive memory, a two-terminal sensing means connected with each of said selected plural locations in said memory, electrical switching means having plural inputs and a single output, wherein each of said plural inputs is responsive to a different one of said sensing means, gating means for selectively connecting one of said inputs of said electrical switching means with said single output, repetitive means for operating said gating means for serially sampling each sensing means in synchronism with said repetitive addressing means so as to derive serial binary information representing the unt of stored binary information in said selective plural locations of said memory.

3. A memory read-out system comprising a random access non-destructive memory consisting of many non-destructive memory elements arranged so that plural memory elements may be addressed according to a matrix selection scheme, means for repetitively adressing selected plural locations in said random access non-destructive memory, a two-terminal sensing means connected with each of said selected plural locations in said memory, electrical switching means having plural inputs and a single output, wherein each of said plural inputs is responsive to a different one of said two-terminal sensing means, gating means for selectively connecting one of said inputs of said electrical switching means with said single output, separate bits of a unit of binary digital information being stored in each of said selective plural locations, repetitive means for operating said gating means for serially sampling each sensing means in synchronism with said repetitive addressing means so as to derive serial binary information representing the unit of stored binary information in said selected plural locations of said memory.

4. A memory read-out system comprising a random access non-destructive memory consisting of plural planes of plural non-destructive memory elements, the memory elements of each of said planes being arranged according to *x* and *y* coordinates, each of said elements in corresponding location of each of said planes coincidentally energizeable to determine the binary state stored therein, each of said elements at a coordinate location in each of said planes coacting to store plural bits of a unit of stored binary digital information, means for repetitively coincidentally energizing each of said elements in a corresponding location of each of said planes, a sensing means connected with each of said coincidentally energized memory elements, electrical switching means having plural inputs and a single output, gating means for selectively connecting one or said inputs to said electrical switching means with said single output, repetitive means for operating said gating means in synchronism with said repetitive addressing means for serially sensing each sampling means to derive serial binary information representing the unit of stored binary information in said selected plural memory elements of said memory.

5. A memory read-out system comprising; a random access non-destructive memory; consisting of plural planes of plural non-destructive memory elements, each of said elements in a corresponding location of each of said planes coincidentally energizeable to determine the binary state stored therein, a two-terminal sensing means connected with each of the memory elements of a given plane, each of said elements functioning to store a bit in a corresponding location of each of said planes co-acting as plural bits of a unit of stored binary digital information which it is desired to read out in serial fashion, each of said elements in corresponding locations of each of said planes acting to derive an electrical pulse in its associated sensing means on the simultaneous selection depending on whether or not one binary state or the other is stored in that element, means for repetitively coincidentally selecting each of said elements in a corresponding location in each of said planes, electrical switching means having plural inputs and a single output, wherein each of said plural inputs is responsive to a different one of said sensing means, gating means for selectively connecting one of said plural inputs of said electrical switching means with said single output, repetitive means for operating said gating means, for serially sampling the sensing means of each plane so as to derive serial binary information representing the unit of stored binary information in corresponding locations in said plural planes.

6. A memory read-out system comprising; a random access non-destructive memory; consisting of plural planes of plural non-destructive memory elements, each of said elements in a corresponding location of each of said planes coincidentally energizeable to determine the binary state stored therein, a two-terminal sensing means connected with each of the memory elements of a given plane, each of said elements functioning to store a bit in a corresponding location of each of said planes coacting as plural bits of a unit of stored binary digital information which it is desired to read out in serial fashion, each of said elements in corresponding locations of each of said planes acting to derive an electrical pulse in its associated sensing means on the simultaneous selection depending on whether or not one binary state or the other is stored in that element, the electrical switching means having plural inputs and a single output, each of said plural inputs being responsive to a different one of said two-terminal sensing means so as to serially sample the sensing means of each plane so as to derive serial binary information representing the unit of stored binary information corresponding to locations in said plural planes.

7. A memory read-out system comprising; a random access non-destructive memory; consisting of plural planes of plural non-destructive memory elements, each of said elements in a corresponding location of each of said planes coincidentally energizeable to determine the binary state stored therein, a two-terminal sensing means connected with each of the memory elements of a given plane, each of said elements functioning to store a bit in a corresponding location of each of said planes coacting as plural bits of a unit of stored binary digital information which it is desired to read out in serial fashion, each of said elements in corresponding locations of each of said planes acting to derive an electrical pulse in its associated sensing means on the simultaneous selection depending on whether or not one binary state or the other is stored in that element, electrical switching means having plural inputs and a single output consisting of a transformer having plural input windings corresponding in number to the number of planes and two-terminal sensing means in said memory and a single output winding, each of said input windings being center tapped and with a selection terminal, each of said input windings having a unidirectional device oriented in the same direction at each extremity forming the conduction path to the corresponding terminal of the corresponding memory plane; a differential amplifier connected to the single output winding of said transformer, means for repetitively coincidentally selecting each of said elements in a corresponding location in each of said planes, repetitive means for successively applying electrical voltage pulses to the center tap of each of said input windings of said transformer for serially sampling the sensing means of each plane so as to derive serial binary information representing the unit of stored binary information in corresponding locations in said plural planes.

8. A memory read-out system comprising; a random access non-destructive memory; consisting of plural planes of plural non-destructive memory elements, each of said elements in a corresponding location of each of said planes being coincidentally selectable to determine the binary state stored therein, two-terminal sensing means associated with each of the memory elements of a given plane; electrical switching means having plural inputs and a single output consisting of a transformer having plural input windings corresponding in number to the number of planes and two-terminal sensing means in said memory and a single output winding, each of said input windings being center tapped and with a selection terminal, each of said input windings having a unidirectional device oriented in the same direction at each extremity forming the conduction path to the corresponding terminal of the corresponding memory plane; a differential amplifier connected to the single output winding of said transformer.

9. An electrical digital system comprising an information storage consisting of non-destructive information elements having distinctive stable states, sensing means associated with said non-destructive information elements for providing an electrical indication of its stable state, electrical sampling switch means having plural inputs and a single output, wherein each of said plural inputs is responsive to a different one of said sensing means, gating means for selectively connecting one of said inputs of said electrical sampling switch means with said single output, repetitive means for operating said gating means for serially sampling each sensing means so as to derive serial binary information representing a unit of stored binary information in said plural non-destructive information elements.

References Cited by the Examiner

UNITED STATES PATENTS

| | | | |
|---|---|---|---|
| 2,929,050 | 3/1960 | Russell | 340—174 |
| 2,988,732 | 6/1961 | Vinal | 340—174 |
| 3,002,107 | 9/1961 | Henle et al. | 307—88 |
| 3,007,056 | 10/1961 | Logue et al. | 307—88 |
| 3,015,732 | 1/1962 | Kuntzleman et al. | 307—88 |
| 3,058,096 | 10/1962 | Humphrey et al. | 340—174 |

OTHER REFERENCES

Publication I "The Transfluxor" by Rajchman and Lo., Proceedings of the IRE, March 1956, pp. 321–332.

BERNARD KONICK, *Primary Examiner.*

JOHN F. BURNS, IRVING L. SRAGOW, *Examiners.*